United States Patent
Kroning et al.

(10) Patent No.: US 10,231,463 B2
(45) Date of Patent: Mar. 19, 2019

(54) FOOD MASS SUITABLE FOR MICROWAVING

(71) Applicant: Chemische Fabrik Budenheim KG, Budenheim (DE)

(72) Inventors: Christian Kroning, Friedrichsdorf (DE); André Lemke, Wiesbaden (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

(21) Appl. No.: 14/761,658

(22) PCT Filed: Jan. 15, 2014

(86) PCT No.: PCT/EP2014/050662
§ 371 (c)(1),
(2) Date: Jul. 17, 2015

(87) PCT Pub. No.: WO2014/111402
PCT Pub. Date: Jul. 24, 2014

(65) Prior Publication Data
US 2015/0351429 A1    Dec. 10, 2015

(30) Foreign Application Priority Data

Jan. 21, 2013 (DE) .......... 10 2013 100 584

(51) Int. Cl.
A21D 2/02    (2006.01)
A23L 5/10    (2016.01)
A23L 5/30    (2016.01)

(52) U.S. Cl.
CPC .......... *A21D 2/02* (2013.01); *A23L 5/15* (2016.08); *A23L 5/34* (2016.08); *A23V 2002/00* (2013.01); *A23V 2200/042* (2013.01)

(58) Field of Classification Search
USPC .......... 426/551, 561, 562, 563, 237, 241
See application file for complete search history.

(56) References Cited

U.S. PATENT DOCUMENTS

| | | |
|---|---|---|
| 3,256,101 A | 6/1966 | Arns |
| 3,418,137 A | 12/1968 | Getchell et al. |
| 4,283,424 A | 8/1981 | Bone et al. |
| 4,396,635 A | 8/1983 | Roudebush et al. |
| 4,419,377 A | 12/1983 | Seward et al. |
| 4,929,465 A | 5/1990 | Kanafani et al. |
| 5,194,271 A | 3/1993 | Yasosky |
| 5,219,602 A | 6/1993 | Saleeb et al. |
| 6,033,697 A | 3/2000 | Judkins et al. |
| 6,284,153 B1 * | 9/2001 | Miller .......... C08K 9/02 252/181.6 |
| 2002/0025360 A1 | 2/2002 | Yang et al. |
| 2006/0177556 A1 * | 8/2006 | Howery .......... A21D 2/186 426/549 |
| 2009/0123607 A1 * | 5/2009 | Brodie .......... A21D 2/02 426/62 |
| 2010/0303956 A1 * | 12/2010 | Hupfer .......... A21D 2/16 426/19 |

FOREIGN PATENT DOCUMENTS

| | | |
|---|---|---|
| EP | 0 202 019 A2 | 11/1986 |
| EP | 0 155 760 B1 | 7/1988 |
| EP | 1 958 520 A2 | 8/2008 |
| EP | 2 319 330 A1 | 5/2011 |
| EP | 2 520 171 A2 | 11/2012 |
| GB | 1 507 867 A | 4/1978 |
| SU | 526958 A1 | 8/1976 |
| WO | WO-92/01384 A1 | 2/1992 |
| WO | WO-94/00024 A1 | 1/1994 |
| WO | WO-94/00029 A1 | 1/1994 |
| WO | WO-2004/098294 A1 | 11/2004 |
| WO | WO-2007/130070 A1 | 11/2007 |
| WO | WO-2009/068378 A1 | 6/2009 |

* cited by examiner

*Primary Examiner* — Lien T Tran
(74) *Attorney, Agent, or Firm* — Drinker Biddle & Reath LLP

(57) ABSTRACT

A method of thawing, heating, cooking and/or baking a foodstuff material, in particular a dough-based product, a pasta, a frozen dough, a panada, a minced meat pasta or a vegetable pasta, in a microwave field. The foodstuff material contains an added microwave absorber in an amount of 0.5 to 5.0% by weight with respect to the total weight of the foodstuff material. The microwave absorber is selected from orthophosphates $(PO_4)^{3-}$, hydrogen phosphates $(HPO_4)^{2-}$, dihydrogen phosphates $(H_2PO_4)^-$, diphosphates $(P_2O_7)^{4-}$ (pyrophosphates), metaphosphates $[(PO_3)_2^2]_n$, tripolyphosphates $(P_3O_{10})^{5-}$ or more highly condensed phosphates with an average chain length of 3 to 50, carbonates, hydroxides, citrates and gluconates of the metals calcium (Ca), magnesium (Mg), iron (Fe), zinc (Zn) and copper (Cu) with the proviso that the water solubility of the microwave absorber at 20° C. is less than or equal to 50 g/L water and the microwave absorber has a pore volume of more than $3.0 \times 10^{-3}$ cm$^3$/g and less than $200 \times 10^{-3}$ cm$^3$/g.

20 Claims, No Drawings

FOOD MASS SUITABLE FOR MICROWAVING

CROSS REFERENCE TO RELATED APPLICATIONS

This application is a National Stage of International Application No. PCT/EP2014/050662 filed Jan. 15, 2014, which claims benefit of German Patent Application No. 10 2013 100 584.5 filed Jan. 21, 2013, both of which are herein incorporated by reference in their entirety.

SUBJECT-MATTER OF THE INVENTION

The invention concerns special microwave absorbers which, when added to a foodstuff material, allow improved heating, cooking and/or baking of the foodstuff material in a microwave field.

BACKGROUND OF THE INVENTION

In the food sector products are increasingly sought and offered, which the consumer can himself put into a ready-to-eat condition merely by heating in a baking oven or in a microwave oven. In that case the products are either already substantially completely in a finished cooked condition and are only heated for consumption or the products are still raw or only pre-cooked or pre-baked and are then further cooked or baked by the consumer to put them into the ready-to-eat condition.

Baking in a conventional baking oven is based on a combination of convection and radiant heat. The foodstuffs are heated from the surface inwardly so that the outside of the foodstuff receives more heat than the interior thereof, whereby it is possible to achieve a crispy exterior.

Heating in a microwave oven in comparison with heating in a baking oven affords a particularly convenient, simple, quick and energy-efficient method of thawing, heating, cooking and/or baking products. In that case the microwave radiation produces in the product dipole and molecular oscillations in the water molecules but also in other polar molecules, whereby heat is generated. In that case the heating effect is not based on the absorption of the microwave radiation at a given resonance frequency. Rather the water molecules constantly seek to become oriented in accordance with the alternating electromagnetic field of the microwave radiation, wherein the heat is produced as a dielectric loss in the entire foodstuff. Unlike the situation when heating in a conventional baking oven where the conduction of heat is from the surface of the product inwardly irradiation with microwaves involves heating substantially through the entire foodstuff at the same time, wherein the extent or the speed of heating at the centre of the foodstuff, in comparison with the heating effect at the surface of the foodstuff, can be very different or very similar depending on the respective depth of penetration of the microwave radiation. The depth of penetration of the microwave radiation is influenced inter alia by the water content and the temperature of the foodstuff. Intensity of microwave radiation decreases exponentially for example in water with an increasing depth of penetration. At any event, substantially no crust formation or surface browning of the foodstuff occurs by virtue of the penetration of the microwave rays through the foodstuff, which under most conditions is good. Particularly in the case of frozen foodstuffs microwave heating in the interior of the foodstuff is delayed to a greater or lesser degree, which is to be attributed to the usually high water or ice content.

The method of microwave heating is therefore not suitable for all kinds of foodstuffs, particularly when pronounced surface heating is wanted. For example dough items like bread, rolls or pizza, upon being heated in a microwave oven, generally become rather soft and moist and do not have any crust formation or browning of the outside of the product as the microwave radiation simultaneously heats the entire product and the necessary external heat which in the case of the radiant heat or convection heat generated in a baking oven, changes the structure of the outer layer, is not produced. In a microwave oven the products generally do not acquire their desired appearance which is typical of the product involved and the organoleptic properties like smell and flavour, as are achieved when heating in a baking oven.

To resolve that problem special product packagings are known, in which the packaging material itself or a coating applied thereto is heated by the microwave radiation and the product contained therein is heated by delivered radiant heat or convection heat. That way of heating the product is closer to heating in a baking oven than heating by the direct interaction of the product with the microwave radiation so that foodstuffs can also be baked in such packagings and a crust and even surface browning is achieved. The production of special microwave packagings is however complicated and expensive and the known microwave packagings are also not suitable for every form of storage of foodstuffs, for example chilled or deep-frozen storage of doughs.

U.S. Pat. No. 4,283,424 describes a frozen pizza which is said to be suitable specifically for finishing baking or re-heating in a microwave oven, wherein crust formation is achieved by the crust of the pizza including two differently, mutually superposed crust layers. The first crust layer comprises a baked dough material which is typical of a cracker, with a residual moisture content of 5% or less, and the second crust layer arranged directly thereover comprises a baked, bread dough-like type of crust with a residual moisture content of 20 to 40%. The cracker crust is so adapted that it absorbs excess moisture which is produced upon microwave heating and the pizza dough forms a crust.

U.S. Pat. No. 5,194,271 describes a dough composition on the basis of a flour with a high amylose content and which serves as a covering for a dough arranged therebeneath and which upon heating in a microwave oven is intended to form a crispy browned crust.

There is therefore a need for foodstuffs, in particular dough-based products, which can be heated at any time in a microwave oven and in that case a result is achieved similarly to when heating, cooking or baking in a conventional baking oven.

OBJECT

The object of the present invention was therefore that of improving thawing, heating, cooking and/or baking of a foodstuff material, in particular a dough-based product, pasta, frozen dough, a panada, minced meat pasta or vegetable pasta, in a microwave field.

DESCRIPTION OF THE INVENTION

That object is attained by a method of thawing, heating, cooking and/or baking a foodstuff material, in particular a dough-based product, a pasta, a frozen dough, a panada, a minced meat pasta or a vegetable pasta, in a microwave field, characterised in that the foodstuff material contains an added microwave absorber in an amount of 0.5 to 5.0% by weight with respect to the total weight of the foodstuff material, wherein the microwave absorber is selected from orthophosphates $(PO_4)^{3-}$ hydrogen phosphates $(HPO_4)^{2-}$, dihydrogen phosphates $(H_2PO_4)^-$, diphosphates $(P_2O_7)^{4-}$ (pyrophosphates), metaphosphates $[(PO_3)_2^{2-}]_n$, tripolyphosphates $(P_3O_{10})^{5-}$ or more highly condensed phosphates with an average chain length of 3 to 50, carbonates, hydroxides, citrates and gluconates of the metals calcium (Ca), magnesium (Mg), iron (Fe), zinc (Zn) and copper (Cu) with the proviso that the water solubility of the microwave absorber at 20° C. is less than or equal to 50 g/L water and the microwave absorber has a pore volume of more than $3.0 \times 10^{-3}$ cm$^3$/g and less than $200 \times 10^{-3}$ cm$^3$/g.

The invention also concerns the use of orthophosphates $(PO_4)^{3-}$, hydrogen phosphates $(HPO_4)^{2-}$, dihydrogen phosphates $(H_2PO_4)^-$, diphosphates $(P_2O_7)^{4-}$ (pyrophosphates), metaphosphates $[(PO_3)_2^{2-}]_n$, tripolyphosphates $(P_3O_{10})^{5-}$ or more highly condensed phosphates with an average chain length of 3 to 50, carbonates, hydroxides, citrates and gluconates of the metals calcium (Ca), magnesium (Mg), iron (Fe), zinc (Zn) and copper (Cu) as a microwave absorber for the production of a foodstuff material, in particular a dough-based product, a pasta, a frozen dough, a panada, a meat pasta or a vegetable pasta, with the proviso that the water solubility of the microwave absorber at 20° C. is less than or equal to 50 g/L water and the microwave absorber has a pore volume of more than $3.0 \times 10^{-3}$ cm$^3$/g and less than $200 \times 10^{-3}$ cm$^3$/g.

The invention also concerns a foodstuff material, in particular a dough-based product, pasta, frozen dough, panada, meat pasta or vegetable pasta, which in addition to the constituents usual for the foodstuff material contains an added microwave absorber in an amount of 0.5 to 5.0% by weight with respect to the total weight of the foodstuff material, wherein the microwave absorber is selected from orthophosphates $(PO_4)^{3-}$, hydrogen phosphates $(HPO_4)^{2-}$, dihydrogen phosphates $(H_2PO_4)^-$, diphosphates $(P_2O_7)^{4-}$ (pyrophosphates), metaphosphates $[(P_{O3})_2^{2-}]_n$, tripolyphosphates $(P_3O_{10})^{5-}$ or more highly condensed phosphates with an average chain length of 3 to 50, carbonates, hydroxides, citrates and gluconates of the metals calcium (Ca), magnesium (Mg), iron (Fe), zinc (Zn) and copper (Cu) with the proviso that the water solubility of the microwave absorber at 20° C. is less than or equal to 50 g/L water and the microwave absorber has a pore volume of more than $3.0 \times 10^{-3}$ cm$^3$/g and less than $200 \times 10^{-3}$ cm$^3$/g.

When reference is made herein to an amount of microwave absorber with respect to the total weight of the foodstuff material that means the proportion of the foodstuff material which contains the added microwave absorber. If for example only the dough proportion of a filled dough pouch or turnover contains the microwave absorber then the quantitative identification of the microwave absorber relates only to the dough proportion without the filling which does not contain the microwave absorber. In the case of a panada containing the microwave absorber the quantitative identification of the microwave absorber relates only to the weight of the panada without the breaded foodstuff which does not contain the microwave absorber. If the amount of microwave absorber is too small, for example below 0.5% by weight, that does not provide for adequate browning and crust formation on the product surface. If the amount of microwave absorber is excessively high, for example above 5% by weight, that can have taste disadvantages.

In a preferred embodiment of the invention the foodstuff material contains the added microwave absorber in an amount of 1.0 to 4.0% by weight, preferably 1.5 to 3.0% by weight, with respect to the total weight of the foodstuff material.

In a further preferred embodiment of the invention the water solubility of the microwave absorber at 20° C. is less than or equal to 20 g/L water, preferably less than or equal to 5 g/L water.

In a further preferred embodiment of the invention the microwave absorber has a pore volume of less than $150 \times 10^{-3}$ cm$^3$/g, preferably less than $125 \times 10^{-3}$ cm$^3$/g.

In a further preferred embodiment of the invention the microwave absorber is selected from monocalcium phosphate anhydrate $(Ca(H_2PO_4)_2)$, monocalcium phosphate monohydrate $(Ca(H_2PO_4)_2.H_2O)$, dicalcium phosphate dihydrate $(CaHPO_4.2H_2O)$, tricalcium phosphate $(Ca_5(PO_4)_3OH)$, acid calcium pyrophosphate $(CaH_2P_2O_7)$, monomagnesium phosphate anhydrate $(Mg(H_2PO_4)_2)$, dimagnesium phosphate trihydrate $(MgHPO_4.3H_2O)$, trimagnesium phosphate tetrahydrate $(Mg_3(PO_4)_2.4H_2O)$, magnesium metaphosphate $([Mg(PO_3)_2]_n)$, magnesium pyrophosphate $(Mg_2P_2O_7)$, iron-III-orthophosphate $(FePO_4)$, iron-III-pyrophosphate $(Fe_4(P_2O_2)_3)$, trizinc phosphate dihydrate $(Zn_3(PO_4)_2.2H_2O)$, zinc pyrophosphate $(Zn_2P_2O_7)$, copper-II-pyrophosphate $(Cu_2P_2O_7)$, sodium aluminium phosphate, acid sodium aluminium sulphate, calcium carbonate $(CaCO_3)$, magnesium hydroxide $(Mg(OH)_2)$, tricalcium citrate, calcium gluconate, tetrasodium pyrophosphate $(Na_4P_2O_7)$ and mixtures thereof.

The compounds used according to the invention which are referred to herein as microwave absorbers confer on the foodstuff material in which they are incorporated particular properties in terms of heating, cooking or baking in the microwave field. It was surprisingly found that the microwave absorbers according to the invention contribute to a particular degree to the microwave energy already being absorbed at the surface of the foodstuff material. That results in particularly strong heating at the product surface, thereby giving a heating implementation similar to that in a conventional baking oven. In that way, depending on the respective nature of the foodstuff, it is possible to provide for browning of the surface and the formation of a crust. The energy of the microwaves is absorbed near the surface by the microwave absorbers according to the invention and converted into heat, whereby heating similarly to that in a conventional baking oven takes place. When heating dough products for example the crumb is formed under similar conditions to those in a baking oven, whereby a raising effect is developed which imparts volume and provides a bakery-typical pore configuration and a bakery-typical pore distribution.

A substantial advantage of the compounds used as microwave absorbers according to the invention is also inter alia that the compounds according to the invention are all completely safe in terms of health and in most cases are also authorised for use in foodstuffs.

The present invention has proven to be quite particularly advantageous in use in doughs and dough products. For example doughs which are stored chilled or frozen and which are unbaked or pre-baked and which contain the microwave absorber according to the invention can be baked up to particular advantage in a microwave oven to give products with the outer and inner structures and properties, that are typical of baked items.

Doughs for baked items are basically distinguished on the basis of the kind of dough raising (baking raising), namely doughs caused to rise by yeast, chemically raised doughs and physically raised doughs. Various combinations of those kinds of raising effects are also used. Particularly preferably the microwave absorbers according to the invention are used in doughs which are raised by yeast and physically raised doughs as when dealing with those doughs, using the microwave absorbers according to the invention, upon heating in a microwave, it is possible to achieve surface browning which comes very close to the true baking process in a baking oven, which is not achieved without the addition of the microwave absorbers.

The microwave absorbers according to the invention are desirably added in addition to the constituents which are typically already present in the foodstuff material. The microwave absorbers according to the invention can be added either individually or in suitable combinations.

Determining the Pore Volume

The pore volume in accordance with the present invention is characterised by means of gas adsorption. The recording of physisorption isotherms (adsorption and desorption isotherms) of inert gas molecules at low temperatures is routinely used for determining solids parameters.

For ascertaining the pore volume according to the invention, isotherms of the low-temperature adsorption and desorption of gaseous nitrogen as adsorptive at 77.3 K, the boiling temperature of liquid nitrogen, were produced with an automatic adsorption apparatus BELSORP-mini II (BEL Japan Inc., Osaka, Japan).

The total pore volume (Vp; unit: cm$^3$/g) of the sample is defined as the pore volume in accordance with the present invention, wherein the pore radius distribution function is ascertained in accordance with the BJH method from the adsorption path of the isotherms (Barrett, E. P., Joyner, L. G., Halenda, P. P., The Determination of Pore Volume and Area Distributions in Porous Substances; I. Computations from Nitrogen Isotherms; J. Amer. Cham. Soc., 73 (1951) 373-380). The BJH method provides an algorithm for the calculation of pore width distribution from nitrogen adsorption data on the assumption of a cylindrical pore geometry. In that respect consideration is given to the change in the adsorbed volume in the pores in dependence on the pore radius, wherein the pore radius distribution function is related as a relative value to the total pore volume. The total pore volume of the sample (Vp) can be determined from the saturation range in accordance with the Gurvich rule on the adsorption path of the isotherms at a relative pressure p/p0>0.995 (Rouquerol, J., et al., Recommendations for the characterization of porous solids; Pure & Applied Chemistry, 66 (1994) 1739-1758). It is assumed that the entire pore system is filled with a capillary condensate.

As already stated above the microwave radiation produces the heat in the foodstuff product itself by dielectric heating, based on the interaction of polar groups of molecules with the alternating electrical field of the electromagnetic oscillation. To be able to heat products in a microwave oven on the one hand they have to be coupled to the microwaves and on the other hand absorb the microwaves. That behaviour is determined by the relative dielectric constant which is a complex value, the real part of which describes the dielectric constant (storage component) and the imaginary part of which describes the loss index (energy loss as heat) of the substance behaviour. The relative dielectric constant is dependent on temperature, density and the composition of the substance. Water plays the crucial role in microwave heating. The higher the loss proportion, the correspondingly greater is the heating effect. If besides water further molecules are involved, with which water enters into a reaction or binding, the dielectric constant falls and the loss index increases. The following three loss proportions can be described:

1. Dipole relaxation of free water molecules in dough products, wherein water tries to become oriented to the electromagnetic field.
2. If it is not just pure water that is involved, then besides pure dipole relaxation the situation also involves the relaxation of bound water, for example in fats, sugars and proteins. Relaxation is dependent on the kind of binding.
3. Ion conductivity (ion motion) also exhibits a loss effect. That is dependent on the concentration and the hydrate sheath of the ions.

The invention will now be further described by means of some embodiments by way of example which however do not limit the invention.

EXAMPLES

Example 1: Investigation of the Energy Delivery Effect of Various Substances in Comparison with Pure Water In a 100 ml glass beaker 2.0 g of substance to be investigated in 50 ml of demineralised water was subjected to microwave radiation in a commercially available microwave device with a microwave power of about 230 watts (device setting) over a predetermined period of time. The temperature during the microwave irradiation procedure was measured by means of a heat sensor arranged in the middle of the glass beaker and plotted in relation to time. The samples were exposed to a continuous irradiation process. Each determining operation was repeated three times. Pure water without additives served as a reference.

It was surprisingly found that only those substances exhibited a positive energy delivery effect, which have a pore volume of more than $3.0 \times 10^{-3}$ cm$^3$/g and less than $200 \times 10^{-3}$ cm$^3$/g and a water solubility of less than 50 g per liter of water at 20° C., that is to say the temperature of the sample with 2 g of the substance to be investigated was at or above the temperature of the microwave-irradiated water without additive. That is explained with an effect due to bound water on the difficulty soluble phosphate compounds used. Weakly bound water on difficulty soluble phosphate compounds exhibits an additional loss proportion. With substances which did not have the substance composition according to the invention, the water solubility according to the invention and the pore volume according to the invention, no energy delivery effect was observed, that is to say the temperature of the microwave-irradiated water without additive was always above the temperature of the sample with 2 g of the substance to be investigated. That is explained with an ion effect of the soluble substances used. The required solution enthalpy is presented with a negative temperature effect in relation to pure water, that is to say energy extraction.

The inventors put forward the explanation for that observation that an increased microwave activity in respect of the substances being investigated occurs when the attraction forces between the water molecules and the substances investigated are greater than the forces which interact between the individual water molecules. The so-called cohesion forces between the molecules of the same kind, that is to say between the individual water molecules, are less than the adhesion forces (molecular attraction forces at the contact surfaces) between the molecules of different kinds, in this case therefore between the water molecules and the substances investigated. It is assumed that the potential water addition to difficulty soluble or insoluble substances produces in the microwave field in the "solid/liquid phase" additional energy by virtue of the dielectric losses, which is liberated in the form of heat. In the microwave field the substance molecules and the water molecules mutually impede each other so that polarisation of the molecules can no longer follow the alternating electromagnetic field. Heating of the medium occurs due to friction (dielectric heating). That microwave effect provides that the heating time of materials which contain the microwave absorbers according to the invention is curtailed or heating is speeded up.

Example 2: Baking Trials with Yeast-Raised Wheat Frozen Doughs

Dough Composition (Basic Recipe):

| | |
|---|---|
| 100 parts by weight | wheat flour (type 550) |
| 54 parts by weight | water |
| 2 parts by weight | baking yeast |
| 2 parts by weight | cooking salt |
| 1 part by weight | vegetable oil |

In addition 2 parts by weight of microwave absorber were added to the basic recipe. The comparative dough did not contain any further additive.

Dough Production and Storage:
Mixing and kneading time: 3+2 minutes (the latter in a Stephan mixer)
Dough standing time: 20 minutes
Dough piece weight: 200 g
Cooking time of the dough pieces: 20 minutes
Freezing time: about 4 hours
Deep freeze storage time: about 2 days
Thawing and Baking Trials:

The deep-frozen dough pieces were exposed to microwave radiation in a microwave oven from Panasonic (model: NN-GD560M—inverter microwave) for a predetermined period of 120 seconds and with a predetermined microwave power of 600 watts (according to the device indication). After 2 minutes of standing time the temperature of the crust and the crumb was measured by means of an infrared temperature sensor at various measurement points on the dough piece.

Measurement value 1 (M1)=average crust temperature outside
Measurement value 2 (M2)=average crumb temperature in the interior of the dough piece.

Table 1 hereinafter gives the additives used ("product"), the solubility thereof in water at 20° C. and the pore volume ascertained in accordance with the invention. The M1 and M2 measured in the thawing and baking trials and the corresponding temperature difference (ΔT) between crust temperature above and crumb temperature of the dough piece are also specified in Table 1. The last column of Table 1 shows the assessment of microwave activity in accordance with the assessment scale shown beneath the Table.

TABLE 1

| Abbreviation | Product | Solubility | Pore Volume [$10^{-3}$ cm$^3$/g] | M1 (° C.) | M2 (° C.) | ΔT (° C.) | Microwave activity |
|---|---|---|---|---|---|---|---|
| REF | —(comparative) | — | — | 66.7 | 50.2 | 16.5 | 3 |
| MCPA(V) | Monocalcium phosphate anhydrate | 18 g/l | 2.3 | 67.1 | 50.1 | 17.0 | 3 |
| MCPM | Monocalcium phosphate monohydrate | 18 g/l | 23 | 79.5 | 47.0 | 32.5 | 2 |
| DCPD | Dicalcium phosphate dihydrate | 0.1 g/l | 5.3 | 77.4 | 51.2 | 26.2 | 2 |
| TCP | Tricalcium phosphate | 0.2 g/l | 120 | 85.7 | 49.5 | 36.2 | 2 |
| CAPP | Acid calcium pyrophosphate | <0.1 g/l | 3.6 | 92.0 | 42.0 | 50.0 | 1 |
| MSPA | Monomagnesium phosphate anhydrate | <0.1 g/l | 4.5 | 88.8 | 47.7 | 41.1 | 1 |
| DMP | Dimagnesium phosphate trihydrate | 0.25 g/l | 6.0 | 81.7 | 39.8 | 41.9 | 1 |
| TMP | Trimagnesium phosphate tetrahydrate | <0.1 g/l | 16 | 86.0 | 45.0 | 41.0 | 1 |
| MMP | Magnesium metaphosphate | <0.1 g/l | 5.1 | 76.9 | 38.5 | 38.4 | 2 |
| MgPP | Magnesium pyrophosphate | <0.1 g/l | 7.1 | 89.4 | 43.6 | 45.8 | 1 |
| FeOP | Iron-III orthophosphate | <0.1 g/l | 19 | 91.2 | 44.2 | 47.0 | 1 |
| FePP | Iron-III pyrophosphate | <0.1 g/l | 30 | 83.9 | 41.3 | 42.6 | 1 |
| TZP | Trizinc phosphate dihydrate | <0.1 g/l | 6.3 | 82.0 | 44.0 | 38.0 | 2 |

TABLE 1-continued

| Abbreviation | Product | Solubility | Pore Volume [$10^{-3}$ cm$^3$/g] | M1 (° C.) | M2 (° C.) | ΔT (° C.) | Microwave activity |
|---|---|---|---|---|---|---|---|
| ZPP | Zinc pyrophosphate | <0.1 g/l | 10.5 | 87.2 | 49.3 | 37.9 | 2 |
| CuPP | Copper-II pyrophosphate | <0.1 g/l | 12 | 87.2 | 49.3 | 37.9 | 2 |
| SALP 1 | Sodium aluminium phosphate 1:3:8 NaH14Al3(PO4)8 | 15 g/l | 13 | 74.8 | 45.2 | 29.6 | 2 |
| SALP 2 | Sodium aluminium phosphate 3:2:8 Na3H15Al2*PO4)8 | 15 g/l | 6.4 | 78.3 | 57.8 | 20.5 | 2 |
| SAS | Acid sodium aluminium sulphate | 15 g/l | 3.9 | 82.8 | 43.2 | 39.6 | 2 |
| CaCO3 | Calcium carbonate | 0.014 g/l | 9.0 | 78.6 | 47.1 | 31.5 | 2 |
| Mg(OH)2 | Magnesium hydroxide | 0.009 g/l | 18.2 | 89.0 | 26.5 | 62.5 | 1 |
| TCC | Tricalcium citrate | 0.85 g/l | 14.2 | 79.5 | 50.9 | 28.6 | 2 |
| CaGl | Calcium gluconate | 30 g/l | 10.0 | 77.1 | 40.5 | 36.6 | 2 |
| MgCl$_2$(V) | Magnesium chloride | 542 g/l | 2.0 | 67.1 | 47.3 | 19.8 | 3 |
| AmMD(V) | Ammonium molybdate | 430 g/l | 2.6 | 75.6 | 51.4 | 24.2 | 3 |
| KTPP(V) | Potassium tripolyphosphate | >200 g/l | 1.1 | 53.9 | 41.6 | 12.3 | 3 |
| TSPP | Tetrasodium pyrophosphate | 50 g/l | 3.3 | 89.3 | 48.5 | 40.8 | 1 |
| STPP(V) | Sodium tripolyphosphate | 145 g/l | 1.1 | 52.4 | 39.8 | 12.6 | 3 |

Assessment of Microwave Activity in Yeast-Raised Wheat Frozen Doughs
1: ΔT=>40° C.=very good
2: ΔT=25 to 40° C.=good
3: ΔT=<25° C.=no additional activity
The additives identified by (V) are comparative examples.

Example 3: Baking Trials with Ready-to-Eat Baking Mixture

Dough Composition (Basic Recipe):
A ready-to-eat baking mixture for lemon cakes from Veripan was used as the basic recipe.
Basic Recipe:
23 parts by weight of wheat flour (type 550)
25 parts by weight of whole egg
25 parts by weight sugar
5 parts by weight water
20 parts by weight vegetable oil
10 parts by weight skimmed milk
2 parts by weight fruit juice concentrate
1 part by weight alcohol
1 part by weight sodium hydrogen carbonate
1 part by weight raising acid
1.5 part by weight cooking salt
0.1 part by weight flavouring In addition 2 parts by weight of microwave absorber were added to the basic recipe. The comparative dough did not contain any further additive.
Dough Production and Storage:
Whole egg and sugar were put into a mixing container and mixed. The powder mixture of the composition (wheat flour, cooking salt and so forth) was slowly mixed in. Vegetable oil, flavouring substances and alcohol were then slowly added and mixing was effected for 12 minutes. After that baking raising agent was added and mixed at a medium stage for a further 2 minutes. After that the microwave absorber was mixed in, the mixer was switched off, and the material was tipped out and stored cool.

Baking Trials:
The dough pieces were exposed to microwave radiation in a microwave oven from Panasonic (see Example 2) for a predetermined period of 140 seconds and with a predetermined microwave power of 600 watts (according to the device indication). After a 1 minute standing time the temperature of the dough piece was measured by means of a thermal imaging camera (Fluke Ti20) and evaluated.

Measurement value 1 (M1)=averaged crust temperature outside

Measurement value 2 (M2)=averaged crumb temperature in the interior of the dough piece.

Table 2 hereinafter specifies the additives used, the temperature measurement values M1 and M2 and the corresponding temperature difference (ΔT) between crust temperature and crumb temperature of the dough piece. The last column of Table 2 shows the assessment of microwave activity in accordance with the assessment scale shown under the Table.

TABLE 2

| Abbreviation | Product | M1 (° C.) | M2 (° C.) | ΔT (° C.) | Microwave activity |
|---|---|---|---|---|---|
| REF | ---(comparative) | 52.8 | 65.2 | −12.4 | 3 |
| CAPP | Acid calcium pyrophosphate | 87.8 | 66.6 | 21.2 | 1 |

TABLE 2-continued

| Abbreviation | Product | M1 (°C.) | M2 (°C.) | ΔT (°C.) | Microwave activity |
|---|---|---|---|---|---|
| MgPP | Acid magnesium pyrophosphate | 83.6 | 64.5 | 19.1 | 2 |
| FEOP | Iron-III-orthophosphate | 83.3 | 67.4 | 15.9 | 2 |
| FePP | Iron-III-pyrophosphate | 80.2 | 53.8 | 26.4 | 1 |

Assessment of Microwave Activity in Doughs of the Ready-to-Eat Baking Mixture
1: ΔT=>20° C.=very good
2: ΔT=15 to <20° C.=good
3: ΔT=<15° C.=no additional additive Example 4: Baking Trials with Puff Pastry Dough Composition (Basic Recipe):
A puff pastry from Veripan was used as the basic recipe.
100 parts by weight wheat flour (type 550)
55 parts by weight water
70 parts by weight vegetable fat (margarine)
3 parts by weight salt
3 parts by weight emulsifier (ascorbic acid)
1 part by weight preserving agent
1 part by weight baking agent
3 parts by weight inverted sugar (dextrose)

2 parts by weight of microwave absorber were further added to the basic recipe. The comparative dough did not contain any further additive.

Dough Production and Storage:

Wheat flour, inverted sugar, emulsifier and optionally microwave absorber were put into a mixing container and mixed. The water and 20% of the vegetable fat were added and kneaded for 3 minutes at a low stage and for 5 minutes at a medium stage with a spiral kneader. The dough temperature was monitored. The target temperature was 18° C. After that the remaining vegetable fat was beaten into the dough. The dough was then folded at intervals each of 30 minutes in 4 working steps, more specifically 2 single and 2 double turns. They give by calculation 144 fat layers (margarine), divided into very thin dough and fat layers. Before processing the dough was stored in a cooled condition for 12 hours.

Thawing and Baking Trials:

Unbaked puff pastry dough roundels without filling and pre-baked puff pastry dough pockets (hot pockets) with a tomato sauce filling were respectively subjected to microwave radiation as deep-frozen dough pieces in a microwave oven from Panasonic (see Example 2) for a predetermined period and with a predetermined microwave power. After a 30 minutes standing time the temperature of the dough piece was measured by means of a thermal imaging camera (Fluke Ti20) and evaluated.

Measurement value 1 (M1)=averaged crust temperature outside
Measurement value 2 (M2)=averaged crumb temperature in the interior of the dough piece.

Microwave Irradiation:
Puff pastry dough roundel (PPD-RO): 440 watts; 200 seconds
Puff pastry dough hot pockets (PPD-HP): 600 watts; 300 seconds Table 3 hereinafter reproduces the additives used, the temperature measurement values M1 and M2 and the corresponding temperature difference (ΔT) between crust temperature and crumb temperature of the dough piece. The last column of Table 3 shows the assessment of microwave activity in accordance with the assessment scale shown below the Table.

TABLE 3

| Abbreviation | Product | M1 (°C.) | M2 (°C.) | ΔT (°C.) | Microwave activity |
|---|---|---|---|---|---|
| REF | ---(comparative) | 91.6 | 86.7 | 4.9 | 3 |
| CAPP | Acid calcium pyrophosphate | 102.0 | 75.5 | 26.1 | 1 |
| MgPP | Acid magnesium pyrophosphate | 92.9 | 77.7 | 15.2 | 2 |
| FEOP | Iron-III-orthophosphate | 93.3 | 78.7 | 15.1 | 2 |
| FePP | Iron-III-pyrophosphate | 110.0 | 92.6 | 16.9 | 2 |

Assessment of Microwave Activity in Puff Pastry Doughs
1: ΔT=>20° C.=very good
2: ΔT=15 to <20° C.=good
3: ΔT=<15° C.=no additional additive The core temperature and the surface temperature were comparably high in the dough pieces without the addition of a microwave absorber. The dough pieces with the additives according to the invention exhibited a surface temperature which was markedly higher than the core temperature.

The invention claimed is:

1. A method comprising adding a microwave absorber selected from the group consisting of orthophosphates $(PO_4)^{3-}$, hydrogen phosphates $(HPO_4)^{2-}$, dihydrogen phosphates $(H_2PO_4)^-$, diphosphates $(P_2O_7)^{4-}$, metaphosphates $[(PO_3)_2^{2-}]_n$, tripolyphosphates $(P_3O_{10})^{5-}$ or condensed phosphates with an average chain length of 3 to 50 phosphate units, carbonates, hydroxides, citrates and gluconates of a metal selected from the group consisting of calcium (Ca), magnesium (Mg), iron (Fe), zinc (Zn) and copper (Cu) to a foodstuff material, with the proviso that the microwave absorber has a water solubility at 20° C. of less than or equal to 50 g/L water and the microwave absorber has a pore volume of more than $3.0 \times 10^{-3}$ cm$^3$/g and less than $200 \times 10^{-3}$ cm$^3$/g, wherein the microwave absorber speeds up heating time for materials which contain the microwave absorber.

2. The method according to claim 1, wherein the microwave absorber is added in an amount of 0.5 to 5.0% by weight with respect to a total weight of the foodstuff material.

3. The method according to claim 1, wherein the water solubility of the microwave absorber at 20° C. is less than or equal to 20 g/L water.

4. The method according to claim 1, wherein the microwave absorber has a pore volume of less than $150 \times 10^{-3}$ cm$^3$/g.

5. The method according to claim 1, wherein the microwave absorber is selected from the group consisting of monocalcium phosphate anhydrate $(Ca(H_2PO_4)_2)$, monocalcium phosphate monohydrate $(Ca(H_2PO_4)_2 \cdot H_2O)$, dicalcium phosphate dihydrate $(CaHPO_4 \cdot 2H_2O)$, tricalcium phosphate $(Ca_5(PO_4)_3OH)$, acid calcium pyrophosphate $(CaH_2P_2O_7)$, monomagnesium phosphate anhydrate $(Mg(H_2PO_4)_2)$, dimagnesium phosphate trihydrate $(MgHPO_4 \cdot 3H_2O)$, trimagnesium phosphate tetrahydrate $(Mg_3(PO_4)_2 \cdot 4H_2O)$, magnesium metaphosphate ([Mg(PO$_3$)$_2$]$_n$), magnesium pyrophosphate (Mg$_2$P$_2$O$_7$), iron-III-orthophosphate (FePO$_4$), iron-III-pyrophosphate (Fe$_4$(P$_2$O$_7$)$_3$), trizinc phosphate dihydrate (Zn$_3$(PO$_4$).2H$_2$O), zinc pyrophosphate (Zn$_2$P$_2$O$_7$), copper-II-pyrophosphate (Cu$_2$P$_2$O$_7$), sodium aluminium phosphate, acid sodium aluminium sulphate, calcium carbonate (CaCO$_3$), magnesium hydroxide (Mg(OH)$_2$), tricalcium citrate, calcium gluconate, tetrasodium pyrophosphate (Na$_4$P$_2$O$_7$) and mixtures thereof.

6. The method according to claim 1, further comprising placing the foodstuff material in a microwave field to thaw, heat, cook, and/or bake the food stuff material.

7. The method according to claim 1, wherein the microwave absorber is added in an amount of 1.0 to 4.0% by weight with respect to the total weight of the foodstuff material.

8. The method according to claim 1, wherein the microwave absorber is added in an amount of 1.5 to 3% by weight with respect to the total weight of the foodstuff material.

9. The method according to claim 1, wherein the foodstuff material is a dough-based product, a pasta, a frozen dough, a panada, a meat pasta, or a vegetable pasta.

10. The method according to claim 1, wherein the water solubility of the microwave absorber at 20° C. is less than or equal to 5 g/L water.

11. The method according to claim 1, wherein the microwave absorber has a pore volume of less than 125×10$^{-3}$ cm$^3$/g.

12. A foodstuff material comprising:
foodstuff material constituents; and
a microwave absorber in an amount of 0.5 to 5.0% by weight with respect to a total weight of the foodstuff material,
wherein the microwave absorber is selected from the group consisting of orthophosphates (PO$_4$)$^{3-}$, hydrogen phosphates (HPO$_4$)$^{2-}$, dihydrogen phosphates (H$_2$PO$_4$)$^-$, diphosphates (P$_2$O$_7$)$^{4-}$, metaphosphates [(PO$_3$)$_2$$^{2-}$]$_n$, tripolyphosphates (P$_3$O$_{10}$)$^{5-}$ or condensed phosphates with an average chain length of 3 to 50 phosphate units, carbonates, hydroxides, citrates and gluconates of a metal selected from the group consisting of calcium (Ca), magnesium (Mg), iron (Fe), zinc (Zn) and copper (Cu), with the proviso that the microwave absorber has a water solubility at 20° C. of less than or equal to 50 g/L water and the microwave absorber has a pore volume of more than 3.0×10$^{-3}$ cm$^3$/g and less than 200×10$^{-3}$ cm$^3$/g, wherein the microwave absorber speeds up heating time for materials which contain the microwave absorber.

13. A foodstuff material according to claim 12, wherein the foodstuff material contains the added microwave absorber in an amount of 1.0 to 4.0% by weight with respect to the total weight of the foodstuff material.

14. A foodstuff material according to claim 12, wherein the water solubility of the microwave absorber at 20° C. is less than or equal to 20 g/L water.

15. A foodstuff material according to claim 12, wherein the microwave absorber has a pore volume of less than 150×10$^{-3}$ cm$^3$/g.

16. The foodstuff material according to claim 12, wherein the microwave absorber is selected from the group consisting of monocalcium phosphate anhydrate (Ca(H$_2$PO$_4$)$_2$), monocalcium phosphate monohydrate (Ca(H$_2$PO$_4$)$_2$H$_2$O), dicalcium phosphate dihydrate (CaHPO$_4$.2H$_2$O), tricalcium phosphate (Ca$_5$(PO$_4$)$_3$OH), acid calcium pyrophosphate (CaH$_2$P$_2$O$_7$), monomagnesium phosphate anhydrate (Mg(H$_2$PO$_4$)$_2$), dimagnesium phosphate trihydrate (MgHPO$_4$.3H$_2$O), trimagnesium phosphate tetrahydrate (Mg$_3$(PO$_4$)$_2$.4H$_2$O), magnesium metaphosphate ([Mg(PO$_3$)$_2$]$_n$), magnesium pyrophosphate (Mg$_2$P$_2$O$_7$), iron-III-orthophosphate (FePO$_4$), iron-III-pyrophosphate (Fe$_4$(P$_2$O$_7$)$_3$), trizinc phosphate dihydrate (Zn$_3$(PO$_4$).2H$_2$O), zinc pyrophosphate (Zn$_2$P$_2$O$_7$), copper-II-pyrophosphate (Cu$_2$P$_2$O$_7$), sodium aluminium phosphate, acid sodium aluminium sulphate, calcium carbonate (CaCO$_3$), magnesium hydroxide (Mg(OH)$_2$), tricalcium citrate, calcium gluconate, tetrasodium pyrophosphate (Na$_4$P$_2$O$_7$) and mixtures thereof.

17. The foodstuff material according to claim 12, wherein the foodstuff material is a dough-based product, a pasta, a frozen dough, a panada, a meat pasta, or a vegetable pasta.

18. The foodstuff material according to claim 12, wherein the water solubility of the microwave absorber at 20° C. is less than or equal to 5 g/L water.

19. The foodstuff material according to claim 12, wherein the microwave absorber has a pore volume of less than 125×10$^{-3}$ cm$^3$/g.

20. The foodstuff material according to claim 12, wherein the microwave absorber is added in an amount of 1.5 to 3% by weight with respect to the total weight of the foodstuff material.

* * * * *